US010858538B2

(12) United States Patent
Watanabe et al.

(10) Patent No.: US 10,858,538 B2
(45) Date of Patent: Dec. 8, 2020

(54) FLAME-RETARDANT CHEMICAL FLOOR MATERIAL AND AQUEOUS PROTECTIVE COATING AGENT THEREFOR

(71) Applicant: KYUSHU HIGHTEC CORPORATION, Kagoshima (JP)

(72) Inventors: Masaki Watanabe, Kagoshima (JP); Kei Irisa, Kagoshima (JP)

(73) Assignee: KYUSHU HIGHTEC CORPORATION, Kagoshima (JP)

( * ) Notice: Subject to any disclaimer, the term of this patent is extended or adjusted under 35 U.S.C. 154(b) by 54 days.

(21) Appl. No.: 15/765,609

(22) PCT Filed: Oct. 3, 2016

(86) PCT No.: PCT/JP2016/079342
§ 371 (c)(1),
(2) Date: Apr. 3, 2018

(87) PCT Pub. No.: WO2017/061391
PCT Pub. Date: Apr. 13, 2017

(65) Prior Publication Data
US 2019/0077987 A1  Mar. 14, 2019

(30) Foreign Application Priority Data
Oct. 5, 2015 (JP) .................................. 2015-208392

(51) Int. Cl.
C09D 183/04 (2006.01)
C09K 21/02 (2006.01)
(Continued)

(52) U.S. Cl.
CPC .......... *C09D 183/04* (2013.01); *C09D 5/024* (2013.01); *C09D 5/18* (2013.01); *C09D 7/61* (2018.01);
(Continued)

(58) Field of Classification Search
CPC ........ C09D 183/04; C09D 5/18; C09D 5/024; C09D 7/67; C09D 7/63; C09D 7/61;
(Continued)

(56) References Cited

U.S. PATENT DOCUMENTS

| 5,091,460 A | 2/1992 | Seto et al. |
| 5,895,713 A * | 4/1999 | Miyazaki ............. C03C 17/009 428/335 |
| 7,022,257 B1 | 4/2006 | Ohkido et al. |

FOREIGN PATENT DOCUMENTS

| JP | 4-175388 A | 6/1992 |
| JP | 2002-69371 A | 3/2002 |

(Continued)

OTHER PUBLICATIONS

English Translation of JP2010163584 (Year: 2010).*
(Continued)

*Primary Examiner* — Andrew J. Oyer
(74) *Attorney, Agent, or Firm* — Birch, Stewart, Kolasch & Birch, LLP (57) ABSTRACT

An object of the present invention is to provide a flame-retardant chemical floor material and an aqueous protective coating agent therefor, which solve, at once, the conventional problems of safety, such as a risk of inflammation, statutory regulations on handling, storage, and transport, and the problem of harmfulness to a human body due to a volatile component such as a solvent. This object is achieved by forming an aqueous coating film on a surface, which has a flash point of 80° C. or higher, does not catch fire even when there is an origin of fire, does not contain a flammable solvent and an alcohol at all as a dilution solvent, and has a glossiness of 80 or more, a hardness of 10H or more, a dry slip property of 0.6 or more, and a wet slip property of 0.5 or more.

3 Claims, 1 Drawing Sheet (51) Int. Cl.
| | |
|---|---|
| *C09K 21/14* | (2006.01) |
| *E04F 15/12* | (2006.01) |
| *C09D 5/02* | (2006.01) |
| *C09D 5/18* | (2006.01) |
| *C09D 7/40* | (2018.01) |
| *C09D 7/61* | (2018.01) |
| *C09D 7/63* | (2018.01) |
| *C08K 3/32* | (2006.01) |
| *C08K 3/36* | (2006.01) |

(52) U.S. Cl.
CPC ............... *C09D 7/63* (2018.01); *C09D 7/67* (2018.01); *C09K 21/02* (2013.01); *C09K 21/14* (2013.01); *E04F 15/12* (2013.01); *C08K 3/32* (2013.01); *C08K 3/36* (2013.01); *C08K 2003/329* (2013.01); *C08L 2201/02* (2013.01)

(58) Field of Classification Search
CPC ......... C09K 21/02; C09K 21/14; E04F 15/12; C08L 2201/02; C08K 2003/329; C08K 3/36; C08K 3/32
See application file for complete search history.

(56) References Cited

FOREIGN PATENT DOCUMENTS

| | | |
|---|---|---|
| JP | 2006-307124 A | 11/2006 |
| JP | 2010-163584 A | 7/2010 |
| JP | 4957926 B2 | 6/2012 |
| JP | 2014-114554 A | 6/2014 |
| JP | 6065247 B2 | 1/2017 |
| JP | WO2014/129081 A1 | 2/2017 |
| WO | WO 2014/129081 A1 | 8/2014 |

OTHER PUBLICATIONS

Extended European Search Report dated Apr. 9, 2019, in European Patent Application No. 16853545.8.

International Search Report for PCT/JP2016/079342 dated Nov. 8, 2016.

Written Opinion of the International Searching Authority for PCT/JP2016/079342 (PCT/ISA/237) dated Nov. 8, 2016.

English translation of International Preliminary Report on Patentability and Written Opinion dated Apr. 19, 2018, in PCT International Application No. PCT/JP2016/079342.

Arkles et al., "Gelest: Silane Coupling Agents—Connecting Across Boundaries (3rd Edition)," Jan. 1, 2014, XP055259337, 76 pages total.

European Communication pursuant to Article 94(3) EPC for European Application No. 16853545.8, dated Jun. 23, 2020.

* cited by examiner

FLAME-RETARDANT CHEMICAL FLOOR MATERIAL AND AQUEOUS PROTECTIVE COATING AGENT THEREFOR

FIELD OF INVENTION

The present invention relates to a flame-retardant chemical floor material and an aqueous protective coating agent for a chemical floor, which enable introduction of a coating for general use, into a floor in many facilities including a facility into which a conventional solvent-based protective coating agent is introduced with difficulty.

ART FIELD RELATED

Chemical floor materials including a vinyl chloride-based chemical floor material have hitherto been used in many facilities, including various commercial facilities and public facilities. For the purpose of protecting the floor surface and maintaining the beauty of the floor, a method of periodically coating a floor surface with a floor polish (hereinafter, referred to as wax) for maintenance has generally been performed. Since this wax is inexpensive and is a water-soluble commercial product, it is easy to handle, and there are a variety of kinds of products. Accordingly, the wax has hitherto been widely spread ranging from commercially available products to products for professional service providers. However, since the material is soft, the wax is poor in durability, the gloss is easily lost depending on walking conditions, dirt and darkening are generated with various concomitants such as sand, gravel, oil, carbonic acid, and alkalis, and a yellowing phenomenon may occur due to deterioration with time. For this reason, the floor maintenance with a wax requires frequent maintenance and periodic peeling work, the peeling waste liquid has to be disposed of as industrial waste, and a peeling agent therefor is strongly alkaline. Thus, sufficient care should be taken for handing the wax. For this reason, peeling work is rarely performed, and continuous maintenance of the beauty with a wax is difficult.

On the other hand, as a new maintenance method as an alternative to the wax, a maintenance method with an ultraviolet radiation type coating agent (hereinafter, UV coating), and a resin-reinforced coating agent are attracting attention. These agents show some improvement in gloss maintenance and generation of darkening which are problems of a wax, but maintenance of the gloss and beauty for a long term is difficult since the agents are also resin-based coating agents. Under the current circumstances, the UV coating agent is scarcely introduced into large stores, since the UV coating agent has to be cured by radiating UV rays with a irradiation device for around a few seconds to a few minutes, and thus the work must be conducted with the worker wearing protective equipment so as not to be directly exposed to an ultraviolet ray, and since this process needs considerable amounts of time and labor. Further, since the hardness is as low as about 4H to 6H, there is no problem in introduction into places where the walking condition and the degree of contamination are relatively mild, for example, hospitals, rehabilitation facilities for the elderly, public facilities, and office buildings. However, it is difficult to be used in places where the walking condition and the degree of contamination are severe, for example, supermarkets, various commercial facilities, restaurants and convenience stores.

For this reason, as shown in prior Patent Document 1, an inorganic protective coating system of a room temperature-curable inorganic coating agent with flexibility for protecting a chemical floor is attracting attention as a new maintenance system, and is used in a variety of facilities. Particularly, the system is characteristic in that the system is introduced into many places where the walking condition and the degree of contamination are severe, which are difficult to be coated by UV coating, for example, supermarkets, various commercial facilities, convenience stores, and various restaurants. Unlike UV coating, this method does not require special treatment during application, can be performed with a commercially available mop similarly to the conventional wax method, and is excellent in workability since the coating agent is dried to touch in about 15 minutes to 20 minutes after application. Further, as described above, since a special device is not required, the method can be introduced relatively easily, and can be applied at a low cost. This material is a coating agent mainly containing a combination of an alkoxysilane and colloidal silica. Since the high gloss of around 80 to 85 is obtained by the same application method as that for a wax, and the coating agent is excellent in gloss maintenance for a long term, the coating agent has such many advantages as management is possible by maintenance around a few times per year to once per a few years, and further, no troublesome peeling work is required, since peeling is unnecessary after application, and as a result, waste liquid treatment is unnecessary, and the system is environmentally friendly. For this reason, the system is positively introduced into many uses, such as not only supermarkets, various commercial facilities, various restaurants, and convenience stores, but also hospitals, rehabilitation facilities for the elderly, public facilities, and office buildings, under the current circumstances. Indeed, the system is paid attention as a new maintenance system, and is a maintenance system for which growth of the market is increasingly expected from now on.

In the prior Patent Document 1, however, there are the following problems concerning these protective coating agents for a floor.

Since the main components are a silane and silica, the raw material of the coating agent contains a silane as a hazardous material, Fourth Group, First Class Petroleum, alcohol-based colloidal silica, and further an alcohol as a solvent, there is a high risk of inflammation, and it is necessary to use the coating agent with sufficient care of safety so as not to cause a fire during handling. In addition, since the coating agent corresponds to a hazardous material defined in the Fire Service Act, a handling and storing method, and a transporting method are regulated by law, and a user have to observe the law strictly. Further, since an internally added alcohol is a volatile organic solvent, the coating agent may be harmful to a human body. For this reason, in working, qualification of an operation chief of organic solvent work is required, it is necessary to handle the coating in accordance with the Industrial Safety and Health Law and, further, a user have to wear protective equipment. For this reason, the coating agent is not always suitable for use in facilities in the public environment.

Since the conventional coating agent for a floor is a solvent-based coating agent, there are such technical problems as an insulating resistance value of a film is high, and that there is a problem in the electrostatic property. Particularly, a floor material which is problematic in generation of static electricity, and application in winter when the air is easily dried need caution. In addition, as the problem of the conventional coating agent for a floor, an internal strain is easily generated since the reaction rate is too high, and for this reason, a whitening phenomenon (a phenomenon caused by a fine crack) and a crack may be caused in a coating film. Particularly, in the case of an aqueous coating agent, since a large amount of water is required for the reaction of a silane, the whitening phenomenon and generation of a crack are more apprehended than in the case of the solvent-based coating agent. As another problem, since adhesion between layers during recoating may became unstable, roughening treatment is necessarily required during recoating in order to enhance interlayer adhesiveness. When the roughening treatment is omitted, deteriorated interlayer adhesion is caused, and a flaw, a crack, peeling etc. may occur.

In Patent Document 2, there is described a "room temperature-curable inorganic coating agent, wherein a room temperature-curable inorganic coating fundamental composition consists of a fundamental composition obtained by internally adding A: 5 to 50 ratio by weight of one or more components selected from silica, silica sol, alumina sol, and titania sol as a hardness-imparting agent, B: 0.02 to 2 ratio by weight of a silane coupling agent as a binder, C: 0.2 to 10 ratio by weight of one or more components selected from silver, tin, zinc, titanium, phosphoric acid, aluminum, and ammonia as an internally added curing promoting catalyst, and D: 0 to 30 ratio by weight of one or more components selected from methanol, ethanol, isopropyl alcohol, and ethyl acetate as a diluent, based on 100 ratio by weight of one or more main components of silicone, siloxane, alkoxide, methyl silicate, ethyl silicate, sodium silicate, and lithium silicate" [claim 3]. Patent Document 2 describes that the film property of the coating agent is such that "the hardness is 8H or more as expressed by the pencil hardness, and the gloss is 60% or more" [claim 1], and that "heat treatment is not required after coating, and when dried to touch for at longest 90 minutes or shorter, a state where the gloss after coating is 60% or more is achieved" [claim 2].

However, in Patent Document 2, since a silane which is likewise a hazardous material, Fourth Group, First Class Petroleum, and an alcohol-dispersed silica sol are used, and an alcohol or the like is used as a dilution solvent, there is a high risk of inflammation when there is an origin of fire. Accordingly, a risk of flammability, statutory regulations on handling, storage, and transport, and the problem of harmfulness to a human body due to a volatile component such as a solvent were to be solved.

Since the coating agent is a solvent-based coating agent, the electrostatic property of a coating film is not defined, an electrification resistance value is not sufficient, and occurrence of static electricity may be problematic depending on the site of use. In the solvent-based coating agent, since the reaction rate of a silane is fundamentally high, curing of a surface portion is promoted too much, a difference in the hardness between the inside and the surface portion is easily caused, and for this reason, a whitening phenomenon and a crack may occur due to an internal strain of a film. Further, when curing of a coating layer progresses, interlayer adhesion becomes unstable, and a flaw, a crack, or peeling may occur due to deteriorated interlayer adhesion unless roughening treatment is properly conducted.

PRIOR ARTS DOCUMENTS

Patent Documents

Patent Document 1: JP 4957926 B
Patent Document 2: JP 2006-307124 A

SUMMARY OF INVENTION

Technical Problems to be Solved

In order to solve such problems, the present invention relates to development of a flame-retardant chemical floor material and an aqueous protective coating agent for a floor therefor, in which a flash point of a silane is 80° C. or higher, which does not contain a combustible solvent such as an alcohol at all, and which has no risk of inflammation even when there is an origin of fire. An object of the present invention is to provide a flame-retardant chemical floor material and an aqueous protective coating agent therefor, which solve, at once, the conventional problems of safety, such as a risk of inflammation, statutory regulations on handling, storage, and transport, and the problem of harmfulness to a human body due to a volatile component such as a solvent.

Another object is to provide a coating agent which, at the same time, improves electrostatic property, suppresses generation of a whitening phenomenon and a crack due to an internal strain at the time of curing the coating agent, and improves interlayer adhesion between the coating layers, that were to be solved in the conventional solvent-based coating agent. Particularly, since the amount of water required for reaction of a silane is large in the aqueous coating agent, it is necessary to delay a reaction more than the case of the solvent-based coating agent and to suppress generation of a whitening phenomenon and a crack. For this reason, an object of the present invention is to provide a flame-retardant chemical floor material and an aqueous protective coating agent therefor having intended for these purposes.

The present invention provides a flame-retardant chemical floor, comprising a surface with a coating film formed thereon, wherein the coating film has a glossiness of 80 or more, a hardness of 10H or more, a dry slip property of 0.6 or more, a wet slip property of 0.5 or more, and an electrostatic property of $1 \times 10^{10} \Omega$, and wherein the coating film is formed by application of an aqueous protective coating agent that has a flash point of 80° C. or higher, that does not catch fire even when there is an origin of fire, and that contains no flammable solvent or alcohol as a dilution solvent, and an aqueous protective coating agent therefore.

Means to Solve the Problems

The first aspect of the present invention relates to a flame-retardant chemical floor, having a surface with a coating film formed thereon, wherein the coating film has a glossiness of 80 or more, a hardness of 10H or more, a dry slip property of 0.6 or more, a wet slip property of 0.5 or more, and the coating film is formed by application of an aqueous protective coating agent that has a flash point of 80° C. or higher, that does not catch fire even when there is an origin of fire, and that contains no flammable solvent or alcohol as a dilution solvent.

In the present invention, there can be provided a flame-retardant chemical floor material, which has a glossiness of 80 or more, a pencil hardness of 10H or more, a dry slip property of 0.6 or more, a wet slip property of 0.5 or more does not contain a combustible solvent at all, and solves, at once, the problems of the previous tiles of this type, such as a risk of inflammation, statutory regulations on handling, storage, and transport, and the problem of harmfulness to a human body due to a volatile component such as a solvent. The flash point is 80° C. or higher, preferably 100° C. or higher. Preferably, the coating film has a surface resistance value of $1\times10^7\Omega \sim 1\times10^{10}\Omega$, more preferably $0.9\times10^{10}\Omega \sim 1\times10^{10}\Omega$, still more preferably $0.93\times10^{10}\Omega \sim 1\times10^{10}\Omega$ as electric properties. In the present invention, it is about $1\times10^{10}\Omega$ at the highest as electric properties.

The second aspect of the present invention relates to an aqueous protective coating agent for a flame-retardant chemical floor, containing, as a main component, a mixture of 20 wt % to 50 wt % of polyorganosiloxane formed of a mixture of an alkoxysilane and a silane coupling agent, and a hydrolysis condensate thereof, in which at least one or tow of the alkoxysilane and the silane coupling agent is trifunctional or bifunctional, 30 wt % to 60 wt % of colloidal silica having an average particle size of 5 nm to 25 nm, and 0.2 wt % to 2.0 wt % of an acid catalyst such as phosphoric acid as a catalyst, relative to 100 wt % of the coating agent, wherein the coating agent contains no flammable solvent or alcohol as a dilution solvent.

The present invention provides a maintenance system, which solves, at once, many conventional problems, such as a risk of a fire in application sites, statutory regulations on handling, storage, and transport of hazardous materials stipulated in the Fire Service Act, appointment of a qualified person of an operations chief of organic solvent work and statutory restriction of the Industrial Safety and Health Law, resulting from use of an alcohol as a solvent, and further, harmfulness to a human body of a volatile component such as an alcohol. For this reason, the present invention has such many advantages as the coating agent can be handled similarly to the conventional wax, can be introduced into every facility safely and with security, is not restricted by statutory regulations of the Fire Service Act and the Industrial Safety and Health Law, and is harmless to a human body. For this reason, it becomes possible to introduce the coating into many places for general use, and the coating agent can be handled similarly to a wax. Thus, growth as a breakthrough maintenance system is expected.

The third aspect of the invention relates to the aqueous protective coating agent for a flame-retardant chemical floor of the invention in the second aspect, wherein concerning the alkoxysilane and the silane coupling agent, at least a material corresponding to or less hazardous than a material of Fourth Group, Third Class Petroleum is mainly selected, one of the material is a silane coupling agent having an epoxy functional group, the content of the silane coupling agent having an epoxy functional group is 5 wt % to 25 wt % relative to 100 wt % of the coating agent, water-soluble colloidal silica is used as the colloidal silica, the dilution solvent for dispersing these components is replaced with water, the total amount of water required for hydrolysis is 50 wt % to 200 wt %, relative to the alkoxysilane and the silane coupling agent, and phosphoric acid is added as the acid catalyst for hydrolysis.

EMBODIMENTS FOR CARRYING OUT INVENTIONS

In the present invention, a base coat as a base material is also made of an aqueous base coat agent containing no combustible. A reaction-curable silane (an alkoxysilane and a silane coupling agent) of the top coat is changed from a silane as a hazardous material, Fourth Group, First Class Petroleum to a silane of Third Class Petroleum having an extremely low risk. The flash point of this silane alone is around 120° C. to 130° C., and the flash point after mixing the two liquids is 100° C. or higher. Thus, a coating agent having no possibility of inflammation even when there is an origin of fire is obtained. For this reason, the mixed liquid is handled as a liquid which is excluded from hazardous materials stipulated in the Fire Service Act. Further, since the coating agent does not contain a solvent such as an alcohol, safety is naturally improved. Moreover, although a volatile component such as a solvent has hitherto been harmful to a human body, the coating agent is harmless since water is adopted as a solvent. For this reason, as compared with the conventional solvent-based coating agent containing an alcohol, safety as defined in the Fire Service Act and the Industrial Safety and Health Law is considerably increased, and the coating agent is little regulated by the statutory regulation, and has no problem of harmfulness to a human body. On the other hand, the obtained film, even in the case of an aqueous protective coating agent, has performance comparable to that of the solvent-based coating agent of the aforementioned patent, and does not require waste liquid treatment since the glossiness of a coating film is around 80 to 90, the hardness of a coating film corresponds to 11H to 12H, and thus the gloss is maintained for a half year to around a few years, and peeling is not required. Further, the coating agent has performance comparable to that of the conventional solvent-based coating agent in every respect, such as the slip property, electrostatic property, water resistance, acid resistance, alkali resistance, chemical resistance, and solvent resistance. In the present invention, as the alkoxysilane and the silane coupling agent, a material corresponding to or less hazardous than a material of Fourth Group, Third Class Petroleum is mainly selected. However, when drying and curing properties of the coating agent become unstable, a silane corresponding to or more hazardous than a material of Third Class Petroleum can be added in a small amount, as far as the flash point in the invention of the first aspect can be maintained.

Besides, concerning the electrostatic property which is a problem of the conventional solvent-based coating agent, a silanol group can be formed on a surface portion of a coating layer, and the electrostatic property can be improved by using not a flammable solvent, but aqueous colloidal silica and water as a solvent, and by using the silane coupling agent having an epoxy functional group as described above. Concerning relaxation of an internal strain of a coating layer, an internal strain is hardly caused, and it becomes possible to form a coating film without causing a whitening phenomenon and a crack by using an alkoxysilane and a silane coupling agent of Third Class Petroleum having a relatively low reaction rate. Particularly, in the case of the aqueous coating agent, since the amount of water required for hydrolysis is large, it was difficult to overcome this problem. However, it was found that by adjusting the total amount of water to 50 wt % to 200 wt %, a coating film can be formed without causing generation of a whitening phenomenon (fine crack caused by internal strain) and a crack. As a method of use, the alkoxysilane and silane coupling agent is used to be mixed and react with aqueous colloidal silica, dilution water, and an acid catalyst in the site of use to react. Further, concerning interlayer adhesion between coating layers, the highly adhesive state has hitherto been obtained by the anchor effect, by performing roughening treatment in the recoating. However, it was found that, by adjusting the amount of a silane coupling agent having an epoxy functional group to 5% to 25%, interlayer adhesion is improved and good adhesion is obtained even if roughening treatment is not performed.

Accordingly, there can be provided a flame-retardant chemical floor material and an aqueous protective coating agent, which can considerably reduce the risk of a fire in application sites, are not restricted by regulations of the Fire Service Act, and can reduce harmfulness to a human body, that have been considered as problems to be solved until now, can be used safely and with security and, at the same time, have overcome, at once, the problems of the conventional solvent-based protective coating agent, such as improvement in electrostatic property, suppression of a whitening phenomenon and a crack due to an internal strain at the time of drying and curing, and improvement in interlayer adhesion.

Functions of the Invention

In the present invention, a silicone resin obtained by reacting and curing an alkoxysilane and a silane coupling agent is used as a basic skeleton in consideration of the required coating film property. As a means for making a silicone resin aqueous, there are roughly three methods in general. One is a method of using a resin dispersed in water obtained by forcibly emulsifying a silicone resin which is an oligomer or a polymer with an emulsifier, and second one is a method of using a self-emulsifying silicone resin obtained by imparting a hydrophilic group to an oligomer or a polymer. Both the methods use an oligomerized or polymerized silicone resin, and even when these resins are used, a film having a high hardness cannot be obtained in general. Moreover, since the curing rate is low, it is difficult to obtain a coating film which withstands use at a normal temperature. Various properties including water resistance of the obtained film tend to be inferior as compared with those of the conventional solvent-based coating. On the other hand, in the method of using an alkoxysilane or a silane coupling agent, conversely, the reaction rate is high, and a film having a high hardness can be obtained after curing. However, a state of being compatibilized with water cannot be stabilized, and it is also difficult to control the reaction rate. As a merit of use of an alkoxysilane, an alkoxysilane is hydrophilic in the state of a silanol group and is compatibilized with water, while when polycondensation progresses and the alkoxysilane is siloxanated, hydrophilicity is reduced, and eventually it does not compatibilize with water. The resultant coating film is not inferior as compared with the conventional solvent-based coating agent, and a coating film having not only water resistance but also the high hardness is obtained.

As described above, when the alkoxysilane or silane coupling agent is used, compatibility with water is increased by the progress of silanolation through hydrolysis, but compatibility is decreased with the progress of polycondensation reaction which progresses at the same time. For this reason, in order to increase compatibility with water by a means other than a silanol group, we paid attention to compatibility of an organic substituent of the silane coupling agent with water. When compatibility of this organic substituent with water is high, stability can be enhanced without being influenced by a degree of hydrolysis or a degree of polycondensation. Examples of a functional group having high compatibility of an organic substituent with water include an amino group, a phenyl group, an acrylic group, and an epoxy group. Among them, examples of a functional group having particularly high compatibility include an amino group and an epoxy group. However, an amino group has a high hydrolysis rate, and has high stability as an aqueous solution, but is slow in polycondensation due to the high stability, and it has such defects as curing progresses with difficulty, and that the obtained coating film is poor in water resistance and is also inferior in weather resistance due to the remaining amino group. To the contrary, an epoxy group has originally high compatibility with water, and the compatibility is further enhanced by ring opening of an epoxide in an acidic or basic region. However, it was found that an epoxy group is polycondensed with a silanol group with time, and the finally obtained coating film has a high hardness and high water resistance. As another characteristic of a coating film obtained with an epoxysilane, the cross-linking density is increased to give high hardness, but the distance between siloxane bonds also contributes to impartation of flexibility by isolation with epoxy groups. This is also an important property for suppressing generation of a crack and a whitening phenomenon, while it is difficult to control the progress of hydrolysis to polycondensation for making the film aqueous.

In order to solve the problem that the stability is low in a state of being compatibilized with water, which is the problem of use of the alkoxysilane, the present invention adopts a method of mixing an alkoxysilane with water (water+colloidal silica) prior to use. Since the mixture is used immediately after mixing, the hydrolysis rate should be high, but the rate of a polycondensation reaction should be low in order to ensure a long time limit of use after mixing, since the molecular weight is increased with the progress of polycondensation, and the compatibility is deteriorated when the molecular weight reaches a certain value or more. These hydrolysis rate and polycondensation rate are determined by the kind of an organic substituent, the pH in an aqueous solution, and the silane coupling material and the amount of water in the system, in addition to the kind of the hydrolysable group of the silane coupling agent. As the hydrolysable group, among alkoxy groups, a methoxy group is advantageous because the hydrolysis should progress sufficiently fast. Regarding the kind of the organic substituent, the molecular weight of the substituent is important, in addition to the degree of hydrophilicity, as described above. There is a tendency that when the molecular weight is high, the hydrolysis rate and the polycondensation rate are reduced due to steric hindrance of the molecule, for example. For this reason, the acrylic group or phenyl group-containing silane has higher hydrophilicity than an alkyl group including a methyl group, but has a lower hydrolysis rate. As a result, the time necessary for completing compatibilization with water is longer. This delay of hydrolysis can be alleviated by adjustment of the pH. However, in such a case, the polycondensation rate is increased at the same time, and as a result, the use limit time is shortened, and thus, it was found that this is not suitable. On the other hand, a silane containing the amino group or the epoxy group, due to high hydrophilicity of the original functional group, can be compatibilized with water without adjustment of pH in the system. Also for these reasons, in the present invention, a silane coupling agent having an epoxy group is most suitable as the silane coupling agent.

As the amount of the silane coupling agent having an epoxy group, 5 wt % to 25 wt % is most preferable. When the amount is smaller than this range, a coating film is thin, and the objective property is not obtained. In addition, even when another silane is added so as to compensate for this defect, a sufficient use limit time is not obtained. In the case where the amount is more than 25 wt %, the polycondensation rate is high, oligomerization progresses, the viscosity is considerably increased, coating is difficult, and reduction in the hardness of a coating film occurs. As the amount of water in the system, 50 wt % to 200 wt % is preferable, based on the total silane amount being a sum of all the alkoxysilane and silane coupling agent. When the amount of water is smaller than this range, oligomerization progresses, coatability is deteriorated, and the hardness is reduced, since the rate of hydrolysis of all the silanes is low, and additionally, the amount of silanes in the system is increased. Meanwhile, in the case where the amount is more than 200 wt %, the ratio of water increases, a coating film is thin, and drying takes time. As the pH of an aqueous solution, it is preferable that the pH is around 1 to 2, since the hydrolysis rate is generally high as compared with the polycondensation rate in acidic region, although hydrolysis and polycondensation progress in either an acidic region or a basic region, and as a result, a relatively small molecule of a monomer to a trimer is stable in an aqueous solution, and ring opening of an epoxy group also progresses to increase compatibility with water. As an acid catalyst for adjustment to such a pH region, an acid catalyst which has low volatility and from which little odor is felt, such as phosphoric acid and citric acid, is preferable, since oxo acids such as hydrochloric acid and nitric acid have high volatility and high corrosiveness, and acetic acid has the problem of odor.

EXAMPLES

As development of an aqueous top coat, fundamentally, a reaction curable coating agent forming a siloxane bond is adopted. For this purpose, selection of a silane (an alkoxysilane and a silane coupling agent) is necessary first of all. The property which is required to be possessed by the silane is that the flash point is high. Desirably, a silane having a flash point not lower than that of a hazardous material, Fourth Group, Third Class Petroleum is adopted. Then, it is required that the silane is soluble in water, and it is also required that it is possible to combine a bifunctional silane in addition to a trifunctional silane, and that flexibility can be imparted by the combination. Flammability of a silane is defined to correspond to or lower than that of Third Class Petroleum because, in consideration of the constitution of a coating agent, the blending rate of a silane is considered to be around 20% to 50%, and it is considered that other components include aqueous colloidal silica, water, and a catalyst. For this reason, there is a high probability that when the flash point is not lower than that of Third Class Petroleum, a mixed solution is eliminated from combustibles. Then, it is required that the silane is soluble in water without necessity of explanation, is soluble in aqueous colloidal silica, and is hydrolysable with water. Thirdly, by combining a trifunctional silane with a bifunctional silane, flexibility is imparted to follow deformation of a chemical floor, as in the conventional method. Hereinafter, the silane (an alkoxysilane and a silane coupling agent) will be explained.

As the trifunctional and bifunctional silanes (an alkoxysilane and a silane coupling agent) satisfying the aforementioned requirements, for example, hexyltrimethoxysilane, hexyltriethoxysilane, octyltriethoxysilane, decyltrimethoxysilane, trifluoropropyltrimethoxysilane, methyltrimethoxysilane, ethyltriethoxysilane, n-propyltriethoxysilane, phenyltrimethoxysilane, phenyltriethoxysilane, dicyclopentyldimethoxysilane, dicyclopentyldiethoxysilane, diphenyldimethoxysilane, and diphenyldiethoxysilane can be used. As the silane coupling agent which similarly satisfies the aforementioned requirement, 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-mercaptopropylmethyldimethoxysilane, and 3-mercaptopropyltrimethoxysilane are used. This silane (an alkoxysilane and a silane coupling agent) is added in the range of 20% to 50% to form a film. On the other hand, as colloidal silica, water-dispersed colloidal silica is used, and is added in the range of about 30% to 60% (around 6% to 24% in terms of solid content). It is desirable that the pH of this colloidal silica is 2 or lower, and the particle size is 5 nm to 25 nm. As a catalyst, water-dispersed phosphoric acid and hydrochloric acid are desirable as an acid catalyst, and the acid catalyst is added at a rate of around 0.5% to 2.0%.

First, in the determination of material specification, the viscosity was measured using, as parameters, various epoxysilanes corresponding to or less hazardous than a material of Third Class Petroleum, and the blending amount thereof, and the blending rate of aqueous colloidal silica. Generally, when the amount of water required for hydrolysis is too large, there is a possibility that coating with a mop in the site of use is difficult, since it is expected that the viscosity in the initial stage is increased and the material becomes more viscous. For this reason, the viscosity should be adjusted to a viscosity at which coating with a mop is possible similarly to a wax. Empirically, it is desirable that the viscosity is in the range of around 3 cSt to 8 cSt (mm$^2$/s). It is necessary to select a silane and determine the blending amount of the silane and silica in order to achieve this viscosity.

TABLE 1

| Epoxysilane | | Blending | Blending | Viscosity | |
| --- | --- | --- | --- | --- | --- |
| Molecular weight | Viscosity | amount of silane | amount of silica | Initial value | After 1 hour |
| 1. About 250 | 6.8 | 20% | 80% | 4.5 | 10.1 |
| | | 30% | 70% | 5.9 | 10.7 |
| | | 40% | 60% | 6.9 | 10.9 |
| | | 50% | 50% | 8.0 | 11.3 |
| 2. About 240 | 6.1 | 20% | 80% | 3.8 | 9.0 |
| | | 30% | 70% | 4.5 | 9.3 |
| | | 40% | 60% | 5.5 | 9.5 |
| | | 50% | 50% | 6.4 | 9.7 |
| 3. About 220 | 5.0 | 20% | 80% | 3.0 | 7.5 |
| | | 30% | 70% | 3.8 | 7.7 |
| | | 40% | 60% | 4.7 | 8.0 |
| | | 50% | 50% | 5.9 | 8.3 |

* Viscosity measurement (cSt) was performed in accordance with the flow cup method of JIS K5600-2-2.
* The viscosity of "initial value" is the viscosity after about 15 minutes from mixing, and "after 1 hour" is the viscosity after 1 hour therefrom.

From the aforementioned results, it is understood that, generally, a silane having a larger molecular weight tends to give a higher viscosity when mixed with aqueous colloidal silica. In addition, it is understood that as the ratio of silane is higher, the viscosity tends to be higher, and on the other hand, as the amount of the silane is smaller and the blending amount of silica is increased, the initial viscosity is low, but the viscosity is increased by hydrolysis with time. From this result, it is desirable to select a silane having a relatively low viscosity, and the blending amount of the silane is 20% to 50%, desirably around 30% to 40%.

Using the aforementioned silanes, the following evaluation test was performed. The evaluation test was performed using, as parameters, the blending amount of the silane (an alkoxysilane and a silane coupling agent), the blending ratio between a trifunctional silane and a bifunctional silane, the blending rate of colloidal silica, and the addition amount of phosphoric acid. The contents of evaluation were determined by measuring viscosity, coatability, drying property, formation of a coating film, glossiness, and hardness. Fundamentally, dilution water was used, in addition to a silane, colloidal silica, and a catalyst.

The total amount of water contained in the coating agent is a sum of water used as dilution water, and water contained in aqueous colloidal silica.

TABLE 2

|  | Silane | Colloidal silica | Acid catalyst |
|---|---|---|---|
| 1. | 55% trifunctional silane | 30% colloidal silica | 2% phosphoric acid |
| 2. | 40% trifunctional silane | 35% colloidal silica | 3% phosphoric acid |
| 3. | 40% trifunctional silane | 55% colloidal silica | 2% phosphoric acid |
| 4. | 36% trifunctional silane 4% bifunctional silane | 20% colloidal silica | 2.0% phosphoric acid |
| 5. | 32% trifunctional silane 8% bifunctional silane | 30% colloidal silica | 2.0% phosphoric acid |
| 6. | 28% trifunctional silane 12% bifunctional silane | 40% colloidal silica | 1.5% phosphoric acid |
| 7. | 35% trifunctional silane | 35% colloidal silica | 2.0% phosphoric acid |
| 8. | 35% trifunctional silane | 45% colloidal silica | 1.0% phosphoric acid |
| 9. | 31.5% trifunctional silane 3.5% bifunctional silane | 30% colloidal silica | 3.0% phosphoric acid |
| 10. | 28.0% trifunctional silane 7% bifunctional silane | 40% colloidal silica | 2.0% phosphoric acid |
| 11. | 24.5% trifunctional silane 10.5% bifunctional silane | 50% colloidal silica | 1.5% phosphoric acid |
| 12. | 30% trifunctional silane | 30% colloidal silica | 3.5% phosphoric acid |
| 13. | 30% trifunctional silane | 45% colloidal silica | 2.0% phosphoric acid |
| 14. | 27% trifunctional silane 3% bifunctional silane | 40% colloidal silica | 2.5% phosphoric acid |
| 15. | 24% trifunctional silane 6% bifunctional silane | 45% colloidal silica | 2.0% phosphoric acid |
| 16. | 21% trifunctional silane 9% bifunctional silane | 50% colloidal silica | 1.5% phosphoric acid |
| 17. | 25% trifunctional silane | 40% colloidal silica | 3.5% phosphoric acid |
| 18. | 25% trifunctional silane | 55% colloidal silica | 2.0% phosphoric acid |
| 19. | 22.5% trifunctional silane 2.5% bifunctional silane | 40% colloidal silica | 2.0% phosphoric acid |
| 20. | 20% trifunctional silane 5% bifunctional silane | 55% colloidal silica | 2.0% phosphoric acid |
| 21. | 17.5% trifunctional silane 7.5% bifunctional silane | 40% colloidal silica | 1.5% phosphoric acid |
| 22. | 20% trifunctional silane | 40% colloidal silica | 3.5% phosphoric acid |
| 23. | 20% trifunctional silane | 55% colloidal silica | 3.5% phosphoric acid |
| 24. | 15% trifunctional silane | 50% colloidal silica | 2.0% phosphoric acid |

According to the aforementioned specification, coating agents were prepared, and the following evaluation test was performed. A method of making a sample was as follows: a coating film having a thickness of 10 μm was formed on a glass plate, and after coating, the coating film was dried at room temperature, and subjected to the measurement after about 1 week.

TABLE 3

|  | Viscosity | Coatability | Drying property | Formation of coating film | Glossiness | Hardness | Determination |
|---|---|---|---|---|---|---|---|
| 1. | 9.5 | Δ | 45 min | Crack | 80 | Unmeasurable | x |
| 2. | 7.5 | ○ | 45 min | Fine crack | 83 | Unmeasurable | x |
| 3. | 8.0 | Δ | 60 min | Good | 85 | Unmeasurable | ○ |
| 4. | 6.0 | ○ | 55 min | Weak gloss | 75 | 9H | x |
| 5. | 6.5 | ○ | 45 min | Good | 83 | 11H | ○ |
| 6. | 7.5 | ○ | 50 min | Good | 83 | 12H | ○ |
| 7. | 6.0 | ○ | 40 min | Good | 83 | 12H | ○ |
| 8. | 6.5 | ○ | 50 min | Good | 84 | 12H | ○ |
| 9. | 6.0 | ○ | 35 min | Fine crack | 85 | Unmeasurable | x |
| 10. | 6.5 | ○ | 40 min | Good | 83 | 12H | ○ |
| 11. | 7.0 | ○ | 45 min | Good | 82 | 13H | ○ |
| 12. | 5.5 | ○ | 40 min | Fine crack | 83 | Unmeasurable | x |
| 13. | 6.0 | ○ | 45 min | Good | 82 | 12H | ○ |

TABLE 3-continued

|  | Viscosity | Coatability | Drying property | Formation of coating film | Glossiness | Hardness | Determination |
|---|---|---|---|---|---|---|---|
| 14. | 5.5 | ○ | 40 min | Fine crack | 82 | Unmeasurable | x |
| 15. | 6.0 | ○ | 45 min | Good | 82 | 12H | ○ |
| 16. | 6.5 | ○ | 50 min | Good | 84 | 12H | ○ |
| 17. | 5.5 | ○ | 40 min | Fine crack | 80 | Unmeasurable | x |
| 18. | 6.5 | ○ | 50 min | Good | 84 | 12H | ○ |
| 19. | 6.0 | ○ | 45 min | Good | 81 | 11H | ○ |
| 20. | 5.5 | ○ | 45 min | Good | 84 | 11H | ○ |
| 21. | 5.5 | ○ | 55 min | Good | 81 | 10H | ○ |
| 22. | 5.0 | ○ | 40 min | Fine crack | 80 | Unmeasurable | x |
| 23. | 5.5 | ○ | 40 min | Fine crack | 82 | Unmeasurable | x |
| 24. | 4.0 | ○ | 60 min | Weak luster | 72 | 9H | x |

Figure 1:
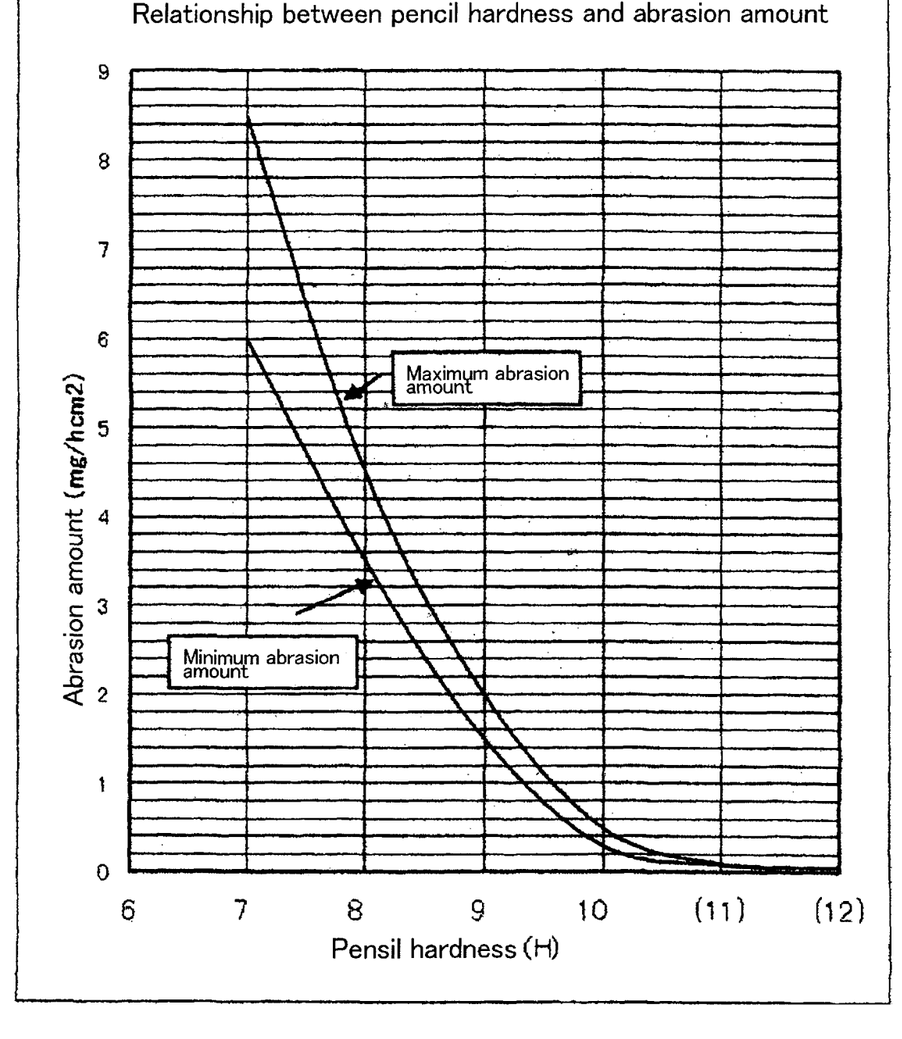
[FIG. 1] Correlation between pencil hardness and abrasive resistance test of (Table-3)

\* Viscosity measurement (cSt) was performed in accordance with a flow cup method of JIS K5600-2-2.
\* Regarding coatability, coatability was compared with that of the conventional solvent system.
\* Drying to touch property is measured according to JIS K5400. After the coating agent was applied to a vinyl chloride floor tile, the center of the coating surface was slightly touched with a fingertip, and the drying time until the coating film does not stain the fingertip is taken as the drying time.
\* Regarding formation of a coating film, a sample was applied to a vinyl chloride floor tile, and change in appearance of the coating film after one week in a room was visually observed.
\* Glossiness is expressed in percentage, and is obtained by measuring reflectivity when the incident angle and the reflection angle are 60° using a mirror surface gloss measuring device according to JIS K5400, relative to the glossiness of a standard surface of the mirror glossiness taken as 100.
\* The pencil hardness is measured according to JIS K-5600. A test piece is fixed on a horizontal base with the coating film surface facing upward, and a pencil is held at an angle of about 45° and pushed about 1 cm to the front of a tester at a uniform speed while being pushed against a coating film surface as strong as possible to such an extent that the lead is not broken, and the coating film surface is scratched. The hardness mark of a hardest pencil with which the coating film surface is not broken is shown. Specification of the JIS pencil hardness test is up to 6H, but an actual pencil is graded up to 10H. Thus, the test was performed according to the pencil hardness. Regarding pencils of 11H or more, 11H, 12H, and 13H were presumed from the correlation data of the pencil hardness test and the abrasion resistance test (FIG. 1).
\* Regarding coatability,
"○" means "coating can be made by a mop."
"Δ" mean "coating is difficult by a mop.
\* Determination
"○" means "showing good finished quality and hardness," that is to say, "showing a coating film of high hardness, having 80 or more of glossiness, 10H or more of hardness, no application line caused by a mop, no crack, mirror like surface."
"x" means "showing troublesome finished quality or hardness," that is to say, "showing no good glossiness, deficiencies such as whitening, application lines and cracks, hardness of 9H or less.

From the aforementioned test results, good results were obtained for samples 3, 5, 6, 7, 8, 10, 11, 13, 15, 16, 18, 19, 20, and 21. In the case of sample 1, the blending amount of the silane was too large, and occurrence of a crack was observed. Regarding samples 2, 9, 12, 14, 17, 22, and 23, since the amount of phosphoric acid was 2.0% or more, curing was promoted too much, and occurrence of a crack was observed. Regarding sample 4, since the blending amount of colloidal silica was too small, the gloss was weak, and the hardness was as low as 9H, this sample was regarded as below standard. Regarding sample 24, since the blending amount of the silane was as small was 15%, the gloss was 80 or less, and the hardness was as low as 9H and, thus, the sample was excluded from the consideration.

From the aforementioned results, it was understood that finishing and performance comparable to those of the solvent system can be obtained by combining trifunctional and bifunctional silanes of water-soluble silanes of Third Class Petroleum, setting the silane amount at 20% to 50%, desirably at 30% to 40% in view of coatability, containing 30% to 60% of aqueous colloidal silica, and adding 0.5% to 2.0% of an acid catalyst such as phosphoric acid as a catalyst.

The following is the evaluation test result when the ratio of an epoxy functional group silane coupling agent in a silane (an alkoxysilane and a silane coupling agent) and the ratio relative to a silane of water required for hydrolysis, such as aqueous colloidal silica and dilution water were used as parameters. In this case, the phosphoric acid amount was fixed at 1.5 wt (%), and the ratio of the solid content of aqueous colloidal silica was 40%.

TABLE 4

|  | Silane (wt %) | | Aqueous | | Ratio of |
|---|---|---|---|---|---|
|  | Epoxy functional group silane coupling agent | Others | colloidal silica (wt %) | Dilution water (wt %) | water relative to silane (%) |
| 1. | 0 | 30 | 30 | 40 | 193 |
| 2. | 3 | 27 | 40 | 30 | 180 |
| 3. | 5 | 25 | 50 | 20 | 166 |
| 4. | 10 | 20 | 20 | 50 | 206 |
| 5. | 15 | 15 | 50 | 20 | 166 |
| 6. | 20 | 10 | 60 | 10 | 153 |
| 7. | 25 | 5 | 70 | 0 | 140 |
| 8. | 30 | 0 | 50 | 20 | 166 |
| 9. | 0 | 40 | 30 | 30 | 120 |
| 10. | 5 | 35 | 40 | 20 | 110 |
| 11. | 10 | 30 | 50 | 10 | 100 |
| 12. | 20 | 20 | 60 | 0 | 90 |
| 13. | 25 | 15 | 40 | 20 | 110 |
| 14. | 30 | 10 | 50 | 10 | 100 |
| 15. | 0 | 50 | 20 | 30 | 84 |
| 16. | 5 | 45 | 30 | 20 | 76 |
| 17. | 15 | 35 | 40 | 10 | 68 |
| 18. | 20 | 30 | 50 | 0 | 60 |
| 19. | 30 | 20 | 50 | 0 | 60 |
| 20. | 10 | 45 | 45 | 0 | 49 |
| 21. | 20 | 40 | 40 | 0 | 40 |

The result of this evaluation test is shown below. As the contents of evaluation, finishing, electrostatic property, the presence or absence of a whitening phenomenon or a crack, and interlayer adhesiveness were evaluated.

TABLE 5

| | Finishing | Electrostatic property $X(10^X\Omega)$ | Presence or absence of whitening phenomenon and crack | Interlayer adhesion | Determination |
|---|---|---|---|---|---|
| 1. | Gloss is weak | 10.5 | Absent | 80/100 | x |
| 2. | Gloss is weak | 10.3 | Absent | 95/100 | x |
| 3. | Good | 10.0 | Absent | 100/100 | o |
| 4. | Delustering | 9.8 | Whitening present | 100/100 | x |
| 5. | Good | 9.5 | Absent | 100/100 | o |
| 6. | Good | 9.3 | Absent | 100/100 | o |
| 7. | Nonuniform finishing | 9.1 | Crack present | 100/100 | x |
| 8. | Nonuniform finishing | 8.9 | Absent | 100/100 | x |
| 9. | Nonuniform finishing | 10.7 | Absent | 85/100 | x |
| 10. | Good | 10.0 | Absent | 100/100 | o |
| 11. | Good | 9.8 | Absent | 100/100 | o |
| 12. | Good | 9.6 | Absent | 100/100 | o |
| 13. | Good | 9.4 | Absent | 100/100 | o |
| 14. | Nonuniform finishing | 9.3 | Absent | 100/100 | x |
| 15. | Nonuniform finishing | 10.8 | Absent | 85/100 | x |
| 16. | Good | 10.0 | Absent | 100/100 | o |
| 17. | Good | 9.7 | Absent | 100/100 | o |
| 18. | Good | 9.5 | Absent | 100/100 | o |
| 19. | Nonuniform finishing | 9.4 | Absent | 100/100 | x |
| 20. | Nonuniform finishing | 9.8 | Crack present | 100/100 | x |
| 21. | Nonuniform finishing | 9.6 | Crack present | 100/100 | x |

\* Regarding finishing, and the presence or absence of whitening and a crack, a sample was applied to a vinyl chloride floor tile, and the appearance of a coating film after drying to touch was visually observed.
\* As the electrostatic property (surface resistance value), samples which had been allowed to stand for a half day or longer under the temperature and humidity conditions of 25° C. and 50% in a room were each measured five times using a surface resistance value measuring device (YC-103), and an average thereof (X represents an exponent whose base is 10. Therefore, the surface resistance value is $10^X$ Ω) was used. Surface resistance value was judged to be good electrostatic property at $1 \times 10^{10}$ Ω or less which does not give empirical feeling of static electricity.
\* Interlayer adhesiveness was obtained by cutting 1 cm² of a coated surface of a test piece into 100 squares of 1 mm², press-bonding a cellophane tape to the test piece, peeling the tape, and determining adhesiveness from the remaining number of square among the 100 squares, according to the grid method of JISK-5400.
\* Determination
"o" means "showing good finished quality, adhesiveness electrostatic property" that is to say, "showing a coating film having 80 or more of glossiness, no crack, no whitening, no peeling according to the grid method, electrostatic property of $1 \times 10^7$ Ω~$1 \times 10^{10}$ Ω."
"x" means "showing troublesome finishing quality, adhesiveness or electrostatic property," that is to say, "showing no good glossiness, deficiencies such as cracks and whitening, peeling according to the grid method, electrostatic property of $1 \times 10^{10}$ Ω or more."

From these test results, good results were obtained for samples 3, 5, 6, 10 to 13, and 16 to 18. Regarding samples 1, 2, 8, 9, 14, 15, and 19, since the addition amount of the epoxy functional group silane coupling agent was not suitable, finishing was nonuniform, and interlayer adhesiveness was unstable, these samples were considered to be out of coverage. Regarding samples 4, 20, and 21, the ratio of water relative to the silane was not suitable, a whitening phenomenon was caused, and occurrence of a crack was observed. Regarding sample 7, the amount of colloidal silica was large, the finishing was nonuniform, and occurrence of a crack was observed.

As described above, it was understood that a good film can be formed, and a film which is excellent in electrostatic property, is free from a whitening phenomenon and a crack, and is excellent in interlayer adhesion can be formed, by adjusting the blending rate of the silane coupling agent having an epoxy functional group in a silane to 5 wt (%) to 25 wt (%), adjusting the total amount of water required for hydrolysis to 50% to 200% relative to an alkoxysilane and a silane coupling agent, adding an acid catalyst such as phosphoric acid thereto, and performing hydrolysis.

EFFECT OF THE INVENTION

In the present invention, there can be provided a flame-retardant chemical floor material, which has a glossiness of 80 or more, a pencil hardness of 10H or more, a dry slip property of 0.6 or more, a wet slip property of 0.5 or more, does not contain a combustible solvent at all, and solves, at once, the problems of this kind of conventional tiles, such as a risk of inflammation, statutory regulations on handling, storage, and transport, and the problem of harmfulness to a human body due to a volatile component such as a solvent.

In the present invention, there is provided a maintenance system which solves, at once, many conventional problems, such as a risk of a fire in application sites, as well as statutory regulations on handling, storage and transport of hazardous materials stipulated in the Fire Service Act, or appointment of a qualified person of an operations chief of organic solvents work, and statutory restriction matters of the Industrial Safety and Health Law, due to use of an alcohol as a solvent, and further, harmfulness to a human body of a volatile component such as an alcohol. For this reason, the present invention has such many advantages as the floor material can be handled similarly to a usual wax, can be introduced into every facility safely and with security, is not restricted by statutory regulations of the Fire Service Act and the Industrial Safety and Health Law, and is harmless to a human body. For this reason, it becomes possible to introduce a coating in many places for general use, the coating can be handled similarly to a wax, and thus, growth is expected as a breakthrough maintenance system.

In the present invention, there is obtained a coating agent of aqueous specification, which does not contain a dilution solvent such as an alcohol at all, and in which a solvent is replaced with water. In addition, a reaction curable silane of a top coat is changed from a silane as a hazardous material, Fourth Group, First Class Petroleum to a silane of Third Class Petroleum which is extremely low in risk. The flash point of this silane alone is around 120° C. to 130° C., and the flash point after mixing the two liquids is 100° C. or higher. Thus, there is obtained a coating agent having no possibility of catching fire even when there is an origin of fire. For this reason, a mixed liquid is handled as a liquid which is excluded from hazardous materials stipulated in the Fire Service Act. Further, since the coating agent does not contain a solvent such as an alcohol at all, safety is naturally improved. Moreover, although a volatile component such as a solvent has hitherto been harmful to a human body, the coating agent is harmless since water is used as a solvent. For this reason, as compared with the conventional solvent-based coating agent containing an alcohol, safety as defined in the Fire Service Act and the Industrial Safety and Health Law is considerably increased, and a coating agent which is little regulated by the statutory regulation, and has no harmfulness to a human body is obtained. On the other hand, the obtained film, even in the case of an aqueous protective coating agent, has performance comparable to that of the solvent system of the aforementioned patent, and does not require waste liquid treatment since the glossiness of a coating film is around 80 to 90, the hardness of a coating film corresponds to 11H to 12H, and thus the gloss is maintained for a half year to around a few years, and peeling is not required. Further, the coating agent has performance comparable to that of the conventional solvent-based coating agent in every respect, such as the slip property, electrostatic property, water resistance, acid resistance, alkali resistance, chemical resistance, and solvent resistance.

At the same time, also concerning the electrostatic property which is a problem of the conventional solvent-based coating agent, the electrostatic property can be improved since a combustible solvent is not used, aqueous colloidal silica and water are used as a solvent, a silane coupling agent having an epoxy functional group is used to form a silanol group on a surface portion of a coating layer, and it becomes possible to easily adsorb water. Regarding relaxation of an internal strain of a coating layer, by using an alkoxysilane and a silane coupling agent of Third Class Petroleum having a relatively low reaction rate, it has become possible to form a coating film without causing a whitening phenomenon and a crack. Particularly, in the case of an aqueous coating agent, since a large amount of water required for hydrolysis exists, this problem tends to be difficult to overcome. However, by controlling the total amount of water to 50 wt % to 200 wt %, a coating film can be formed without causing occurrence of a whitening phenomenon (fine crack caused by internal strain) and a crack. Further, concerning interlayer adhesion between coating layers, hitherto, a roughening treatment is performed in the recoating to obtain a highly adhesive state by the anchor effect. However, it was found that by internally adding a silane coupling agent having an epoxy functional group in the range of 5% to 25%, interlayer adhesion is improved and good adhesion is obtained even when the roughing treatment is not performed.

Hence, by the present invention, the conventional problems such as a risk of a fire in application sites, as well as statutory regulations on handling, storage, and transport of hazardous materials stipulated in the Fire Service Act, appointment of a qualified person of an operations chief of organic solvents work, and statutory restriction of the Industrial Safety and Health Law, due to use of an alcohol as a solvent, and further, harmfulness to a human body of a volatile component such as an alcohol, can be solved at once. In addition, the coating agent takes measures against the problems of the conventional solvent system to improve electrostatic properties, and whitening phenomena, countermeasures against cracks, and interlayer adhesion, and can be handled similarly to a usual wax. For this reason, the coating agent has many advantages that it can be introduced into every facility safely and with security, is not restricted by statutory regulations of the Fire Service Act and the Industrial Safety and Health Law, and is harmless to a human body. For this reason, the coating can be introduced into every place for general use, and thus the coating agent is a breakthrough system much better than the conventional solvent system.

The invention claimed is:

1. An aqueous protective coating agent for a flame-retardant chemical floor, comprising,
    (A) 20 wt % to 50 wt % of a silane soluble in water and hydrolysable with water,
    (B) 6 wt % to 24 wt % in terms of solid content of water-dispersed colloidal silica having an average particle size of 5 nm to 25 nm,
    (C) 0.2 wt % to 2.0 wt % of phosphoric acid as an acid catalyst, and
    (D) 50 wt % to 200 wt % of water relative to the silane,
    wherein the component (A) is mixed with the other components before use so that the total of the components of (A)+(B)+(C)+(D) is 100 wt %,
    wherein the silane is a mixture of an alkoxysilane and a silane coupling agent, which consists of a trifunctional silane and a bifunctional silane, and the alkoxysilane and the silane coupling agent which have a flash point of 80° C. or higher are mainly contained as the silane,
    wherein the silane coupling agent contains a silane coupling agent having an epoxy functional group in an amount of 5 wt % to 25 wt %, and
    wherein the aqueous protective coating agent contains no flammable solvent or alcohol.

2. The aqueous protective coating agent according to claim 1, wherein the aqueous protective coating agent contains water only as a dilution solvent.

3. A flame-retardant chemical floor, comprising a surface with a coating film formed thereon with an aqueous protective coating agent according to claim 1,
    wherein the coating film has a glossiness of 80 or more, a hardness of 10H or more, a dry slip property of 0.6 or more, a wet slip property of 0.5 or more.

* * * * *